United States Patent [19]

Goto

[11] Patent Number: 4,580,887

[45] Date of Patent: Apr. 8, 1986

[54] SINGLE-LENS REFLEX CAMERA WITH INTERCHANGEABLE VIEWFINDER AND INTERCHANGEABLE LENS

[75] Inventor: Kazuo Goto, Tokyo, Japan

[73] Assignee: Asahi Kogaku Kogyo Kabushiki Kaisha, Tokyo, Japan

[21] Appl. No.: 619,420

[22] Filed: Jun. 11, 1984

[30] Foreign Application Priority Data

Jun. 23, 1983 [JP] Japan ............................ 58-95743[U]

[51] Int. Cl.[4] .............................................. G03B 13/02
[52] U.S. Cl. .................................... 354/219; 354/286; 354/400
[58] Field of Search ............... 354/219, 224, 225, 152, 354/155, 286, 219 IF, 400

[56] References Cited

U.S. PATENT DOCUMENTS 3,967,299 6/1976 Shono .................................. 354/219
4,469,422 9/1984 Kimura et al. ...................... 354/286
4,482,230 11/1984 Magariyama et al. .............. 354/219

*Primary Examiner*—A. A. Mathews
*Attorney, Agent, or Firm*—Sughrue, Mion, Zinn, Macpeak, and Seas

[57] ABSTRACT

A single-lens reflex camera of a type having an interchangeable viewfinder and an interchangeable lens in which electrical signals are transmitted between the viewfinder and lens directly without going through the body of the camera. A first group of contacts is arranged on a protrusion of the interchangeable viewfinder. Preferably, this first group of contacts is spring loaded. A second group of contacts is provided on the barrel of the interchangeable lens. The first and second groups of contacts are arranged so that, when both the viewfinder and the lens are mounted on the body of the camera, respective ones of the contacts of the two groups are in contact with one another.

3 Claims, 3 Drawing Figures

SINGLE-LENS REFLEX CAMERA WITH INTERCHANGEABLE VIEWFINDER AND INTERCHANGEABLE LENS

BACKGROUND OF THE INVENTION

The present invention relates to a single-lens reflex camera in which signals are transmitted between an interchangeable viewfinder and an interchangeable lens.

In one conventional single-lens reflex camera of this same general type, an interchangeable viewfinder is mounted on a viewfinder mount of the camera body, and an interchangeable lens is detachably mounted on the lens mount thereof. In order to transmit signals between the interchangeable viewfinder and the interchangeable lens, mating signal contacts are provided on the interchangeable viewfinder and the viewfinder mount, while other mating signal contacts are provided on the interchangeable lens and the lens mount. Signals are thereby transmitted through the camera body between the interchangeable viewfinder and the interchangeable lens. In another approach, a relay cable is connected between the interchangeable viewfinder and the lens mount and signals are transmitted therethrough without passing through the camera body.

In the conventional single-lens reflex camera in which signals are transmitted between the interchangeable lens and the interchangeable viewfinder through the camera body, it is necessary to provide contacts and connecting wires on and in the camera body, and hence the number of components is large. Furthermore, in addition to the abovedescribed signal contacts, contacts for transmitting signals between the camera body and the interchangeable lens and between the camera body and the interchangeable viewfinder must be provided on the connecting parts of the lens mount and the viewfinder mount. Therefore, the connecting parts are congested with the contacts. Accordingly, the contacts may not work satisfactorily. In addition, the space available for the contacts is limited, and thus the number of contacts is limited, limiting the number of signals which can be carried. On the other hand, in a camera in which a relay cable is used so that signals are transmitted between the interchangeable lens and the interchangeable viewfinder without passing through the camera body, the relay cable must be disconnected and reconnected whenever the interchangeable lens or the interchangeable viewfinder is changed, making replacement of the interchangeable lens or viewfinder troublesome.

In view of the foregoing, an object of the invention is to provide a single-lens reflex camera of a type having an interchangeable viewfinder and an interchangeable lens in which, according to the invention, signal contacts for transmitting signals between the interchangeable viewfinder and the interchangeable lens are arranged on the interchangeable viewfinder and the interchangeable lens in such a manner that the signal contacts are connected to one another when the interchangeable viewfinder and the interchangeable lens are mounted on the body of the camera, whereby the number of components is reduced, the contacts operate with high stability, more signals can be transmitted therebetween, and replacement of the interchangeable lens or viewfinder can be readily achieved.

DESCRIPTION OF THE PREFERRED EMBODIMENTS

The invention will be described with reference to the accompanying drawing.

Figure 1:
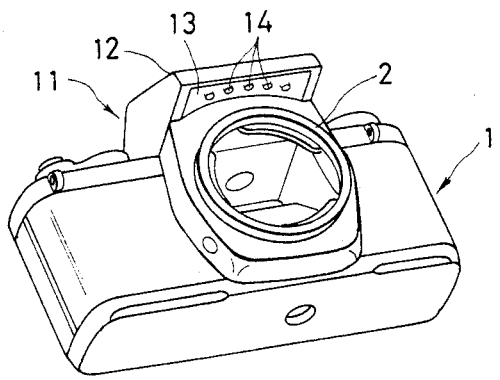
FIG. 1 is a perspective view showing an automatic focus viewfinder mounted on a camera body.
Figure 2:
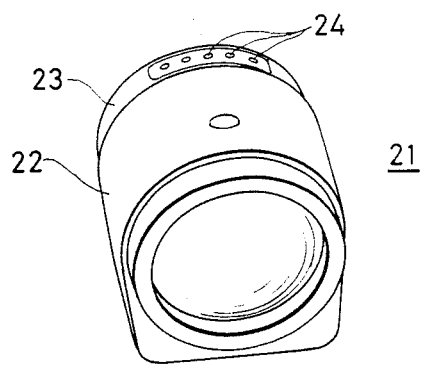
FIG. 2 is a perspective view of an automatic focus lens.
Figure 3:
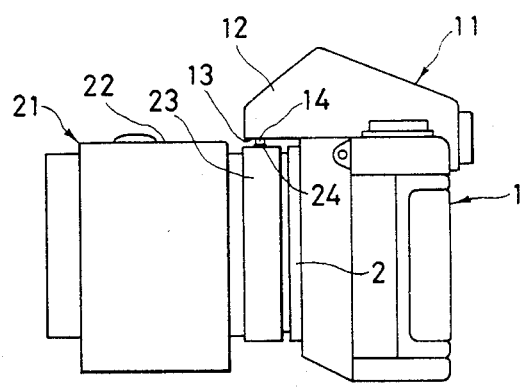
FIG. 3 is a side view of a single-lens reflex camera on which the automatic focus viewfinder and the automatic focus lens are mounted.

FIGS. 1 through 3 show a preferred embodiment of the invention. First, the overall arrangement will be described. In these figures, reference numeral 1 designates a camera body. A lens mount 2 is provided on the front of the camera body, and a viewfinder mount (not shown) is provided on the top of the camera body. An automatic focus viewfinder 11, one example of an interchangeable viewfinder, is detachably mounted on the viewfinder mount. The automatic focus viewfinder 11, which incorporates an automatic focusing device, has a protrusion 12 which extends forwardly of the camera body. Several viewfinder contact pins 14 are mounted on the lower surface 13 of the protrusion 12. The viewfinder contact pins 14 are connected to the automatic focusing device to transmit signals between an automatic focus lens 21 (described below) and the automatic focusing device. The contact pins 14 are maintained urged downwardly, substantially perpendicularly to the optical axis of the lens, by springs (not shown).

The automatic focus lens 21, one example of an interchangeable lens, is detachably mounted on the lens mount 2 of the camera body 1. The automatic focus lens 21 incorporates a lens drive device and an electric source for focusing. The automatic focus lens 21 has contacts 24 mounted on the outer wall of the rear part 23 of the lens barrel 22. The contacts 24 are connected to the aforementioned lens drive device, etc., to transmit signals between the automatic focus viewfinder and the lens drive device, etc. The contact pins 14 on the viewfinder side are connected directly to the contacts 24 on the lens side when the automatic focus viewfinder 11 and the automatic focus lens 21 are mounted on the camera body 1.

The operation of the single-lens reflex camera thus constructed will be described. The automatic focus viewfinder 11 is mounted on the viewfinder mount of the camera body 1. The automatic focus lens 21 is inserted into the lens mount 2 and then turned through a predetermined angle to mount it in the usual manner. In this operation, the contact pins 14 on the viewfinder side are slidably moved into contact with the contacts 24 so that the former are connected to the latter under a suitable pressure. As a result, signals, such as an automatic focusing signal, can be transmitted between the automatic focus viewfinder 11 and the automatic focus lens 21 through the contact pins 14 and the contacts 24 without passing through the camera body 18.

Because these signals are not transmitted through the camera body 1, it is unnecessary for the lens mount 2 and the viewfinder mount of the camera body to be provided with contacts for transmitting signals between the automatic focus lens 21 and the automatic focus viewfinder 11, and accordingly it is unnecessary to provide signal transmitting wires in the camera body.

Thus, the total number of components in the camera system is reduced.

In the conventional camera, contacts for transmitting signals between the camera body 1 and the automatic focus lens 21 are provided on the lens mount 2 of the camera body, and contacts for transmitting signals between the camera body 1 and the automatic focus viewfinder 11 are provided on the viewfinder mount. However, according to the invention, it is unnecessary to provide contacts for transmitting signals between the viewfinder 11 and the lens on the lens mount and the viewfinder mount. Hence, the arrangement of the contacts is not so limited in space, and the degree of freedom in design is increased. Of course, the same is true for the automatic focus viewfinder 11 and the automatic focus lens 21. In the lens mount 2 and the viewfinder mount, the number of contacts is reduced according to the invention, and therefore the remaining contacts can be arranged at increased intervals, thus attaining a high stability. The space for the arrangement of the contacts is thus not so limited as in the conventional case, and therefore, the camera according to the invention can have more contacts than a conventional camera and is able to transmit more data as the technology advances.

The automatic focusing lens can be replaced readily in a short time because no relay cable is used.

Furthermore, according to the preferred embodiment of the invention, even a camera having no automatic focusing device in its camera body can operate as an automatic focus camera when the automatic focus viewfinder 11 and the automatic focus lens 21 are mounted thereon.

With the invention, the interchangeable viewfinder and the interchangeable lens are not limited to those which are of automatic focusing type. That is, they may be of the interchangeable type and be so designed that signals are transmitted therebetween.

As is apparent from the above description, according to the invention, contacts for transmitting signals between the interchangeable viewfinder and the interchangeable lens are provided on the interchangeable viewfinder and the interchangeable lens in such a manner that the contacts are connected directly to one another when the viewfinder and lens are mounted on a camera body. Accordingly, the number of components is decreased, and the contacts operate with a high stability. Furthermore, the number of contacts can be increased to transmit a large amount of information. In addition, changing the lens can be readily achieved.

I claim:

1. A single-lens reflex camera having an interchangeable viewfinder and an interchangeable lens, comprising: a plurality of signal contacts for transmitting signals between said interchangeable viewfinder and said interchangeable lens, first and second groups of said signal contacts being arranged on said interchangeable viewfinder and said interchangeable lens, respectively, in such a manner that respective ones of said contacts of said first and second groups contact one another when said interchangeable viewfinder and said interchangeable lens are mounted on the body of said single-lens reflex camera.

2. The single-lens reflex camera of claim 1, wherein said first group of contacts is arranged on a protrusion of said viewfinder.

3. The single-lens reflex camera of claim 2, wherein said contacts of said first group are spring loaded, urged in the direction of said contacts of second group.

* * * * *